US007882056B2

(12) United States Patent
Begole et al.

(10) Patent No.: US 7,882,056 B2
(45) Date of Patent: Feb. 1, 2011

(54) METHOD AND SYSTEM TO PREDICT AND RECOMMEND FUTURE GOAL-ORIENTED ACTIVITY

(75) Inventors: James M. A. Begole, San Jose, CA (US); Victoria M. E. Bellotti, San Francisco, CA (US); Nicolas B. Ducheneaut, Sunnyvale, CA (US); Robert R. Price, Palo Alto, CA (US); Kurt E. Partridge, Palo Alto, CA (US); Michael Roberts, Woodside, CA (US); Ed H. Chi, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 639 days.

(21) Appl. No.: 11/857,386

(22) Filed: Sep. 18, 2007

(65) Prior Publication Data

US 2009/0077000 A1 Mar. 19, 2009

(51) Int. Cl.
*G06N 5/00* (2006.01)
(52) U.S. Cl. .......................................... 706/54; 706/45
(58) Field of Classification Search .................. 706/54, 706/45
See application file for complete search history.

(56) References Cited

U.S. PATENT DOCUMENTS

| 6,236,768 B1 | 5/2001 | Rhodes |
| 2003/0004937 A1 | 1/2003 | Salmenkaita |
| 2004/0039630 A1 | 2/2004 | Begole |

OTHER PUBLICATIONS

Dickinson, et al, User Profiling with Privacy: A Framework for Adaptive Information Agents, Lecture Notes in Computer Science: Intelligent Information Agents, 2003, pp. 123-151.*
The technical aspects identified in the present application are considered part of the common general knowledge. Due to their notoriety no documentary evidence is found to be require. For further details see the accompanying Opinion and the reference below. XP002456252, Sep. 18, 2007.
Michael G. Lamming and William M. Newman, Activity-Based Information Retrieval: Technology in Support of Personal Memory, 1992.
Bill N. Schilit, Norman Adams and Roy Want, Context-Aware Computing Applications, 1994.
Daniel Ashbrook and Thad Starner, Using GPS to Learn Significant Locations and Predict Movement Across Multiple Users, In Personal and Ubiquitous Computing, vol. 7, No. 5, Oct. 2003, pp. 275-286.

(Continued)

*Primary Examiner*—Wilbert L Starks, Jr.
(74) *Attorney, Agent, or Firm*—Park, Vaughan, Fleming & Dowler LLP; Shun Yao

(57) ABSTRACT

One embodiment of the present invention provides a method for recommending activities to a user. During operation, the system determines an activity-type distribution based on the user's personal profile and/or population prior information, thereby facilitating prediction of future activities for the user. The system further searches for and receives one or more activities based on the activity-type distribution. The system then scores each received activity and recommends a number of activities to be performed by the user in the future and a number of corresponding venues, based on the activity-type distribution and the weight distribution.

25 Claims, 4 Drawing Sheets

OTHER PUBLICATIONS

Nuria Oliver, Ashutosh Garg and Eric Horvitz, Layered Representations for Learning and Inferring Office Activity from Multiple Sensory Channels, Feb. 2004.

Matthai Philipose et al., Inferring Activities from Interactions with Objects, Pervasive Computing, Oct.-Dec. 2004, www.computer.org/pervasive.

Mike Perkowitz et al., Mining Models of Human Activities from the Web, WWW 2004, May 17-22, 2004, New York, NY.

Joshua R. Smith, et al., RFID-Based Techniques for Human-Activity Detection, Communications of the ACM, Sep. 2005, vol. 48, No. 9, pp. 39-44.

Lin Liao, Dieter Fox and Henry Kautz, Location-Based Activity Recognition using Relational Markov Networks, In Proc. of the International Joint Conference on Artificial Intelligence (IJCAI), 2005.

Nathan Eagle and Alex (Sandy) Pentland, Eigenbehaviors: Identifying Structure in Routine, Ubicomp '06, Sep. 17-21, 2006, Orange County, CA.

Alvin Raj, Amarnag Subramanya, Dieter Fox and Jeff Bilmes, Rao-Blackwellized Particle Filters for Recognizing Activities and Spatial Context from Wearable Sensors, 2006.

Lin Liao, Dieter Fox and Henry Kautz, Hierarchical Conditional Random Fields for GPS-based Activity Recognition, Robotics Research: The Eleventh International Symposium, 2007.

\* cited by examiner

METHOD AND SYSTEM TO PREDICT AND RECOMMEND FUTURE GOAL-ORIENTED ACTIVITY

BACKGROUND

1. Field of the Invention

The present disclosure relates to a recommender system. More specifically, the present disclosure relates to a recommender system for predicting and recommending future goal-oriented activities.

2. Related Art

In today's technology-oriented society, a primary source of information is recommender systems. Recommendation systems help individuals discover items they might not necessarily be able to find on their own. Personalized, satisfactory recommendations are often difficult to attain, because effective recommendations often depend on how accurately the system can match a user's needs and preferences. Some systems, such as online shopping sites, use user surveys or a user's past selections to derive such information. However, accurate prediction of a user's needs and preferences remains a challenge, especially in situations where explicit user data is limited or unavailable.

SUMMARY

One embodiment of the present invention provides a method for recommending activities to a user. During operation, the system determines an activity-type distribution based on the user's personal profile and/or population prior information, thereby facilitating prediction of future activities for the user. The system further searches for and receiving one or more activities based on the activity-type distribution. The system then produces at least one score indicative of a probability for engagement in each received activity.

In one variation of this embodiment, the system recommends a number of activities to be performed by the user in the future.

In one variation of this embodiment, the system recommends a number of venues based on the activity-type distribution and the weight distribution.

In a variation of this embodiment, the activity-type distribution is further determined based on at least one of: a time of day, a day of week, a week of year, an indication of a holiday, n indication of a date of personal significance to the user, a weather condition, and a content previously accessed by the user.

In a further variation, the content accessed by the user can include one or more of: an email, an instant message, a web page, an appointment, a calendar entry, and a phone call.

In a further variation, the activity-type distribution is further determined based on a location and one or more activity types associated with the venues in the vicinity of the location.

In a variation of this embodiment, the system constructs the user's personal profile based on information indicative of the user's past activities in specific contexts.

In a variation of this embodiment, the system estimates a current or past activity type the user is or has engaged in. Furthermore, recommending the activities involves filtering activities which are inconsistent with the estimated current or past activity.

In a variation of this embodiment, the system recommends a support activity which facilitates the performance of a recommended activity.

In a variation of this embodiment, the system determines that the user is co-present with at least one other user for the first time. The system then combines all the users' individual activity-type distributions to generate a joint activity-type distribution and combines all the users' individual metric-weight distributions to generate joint metric-weight distributions. Furthermore, the recommendation of the activities is based on the joint activity-type distribution and joint metric-weight distribution.

In a variation of this embodiment, the system determines that the user has been repeatedly co-present with at least one other user and constructs the personal profile for all the users who have been co-present.

In a variation of this embodiment, the system collects data about the user's activity preferences when the user interacts with a device that presents the recommended activities.

DETAILED DESCRIPTION

Figure 1:
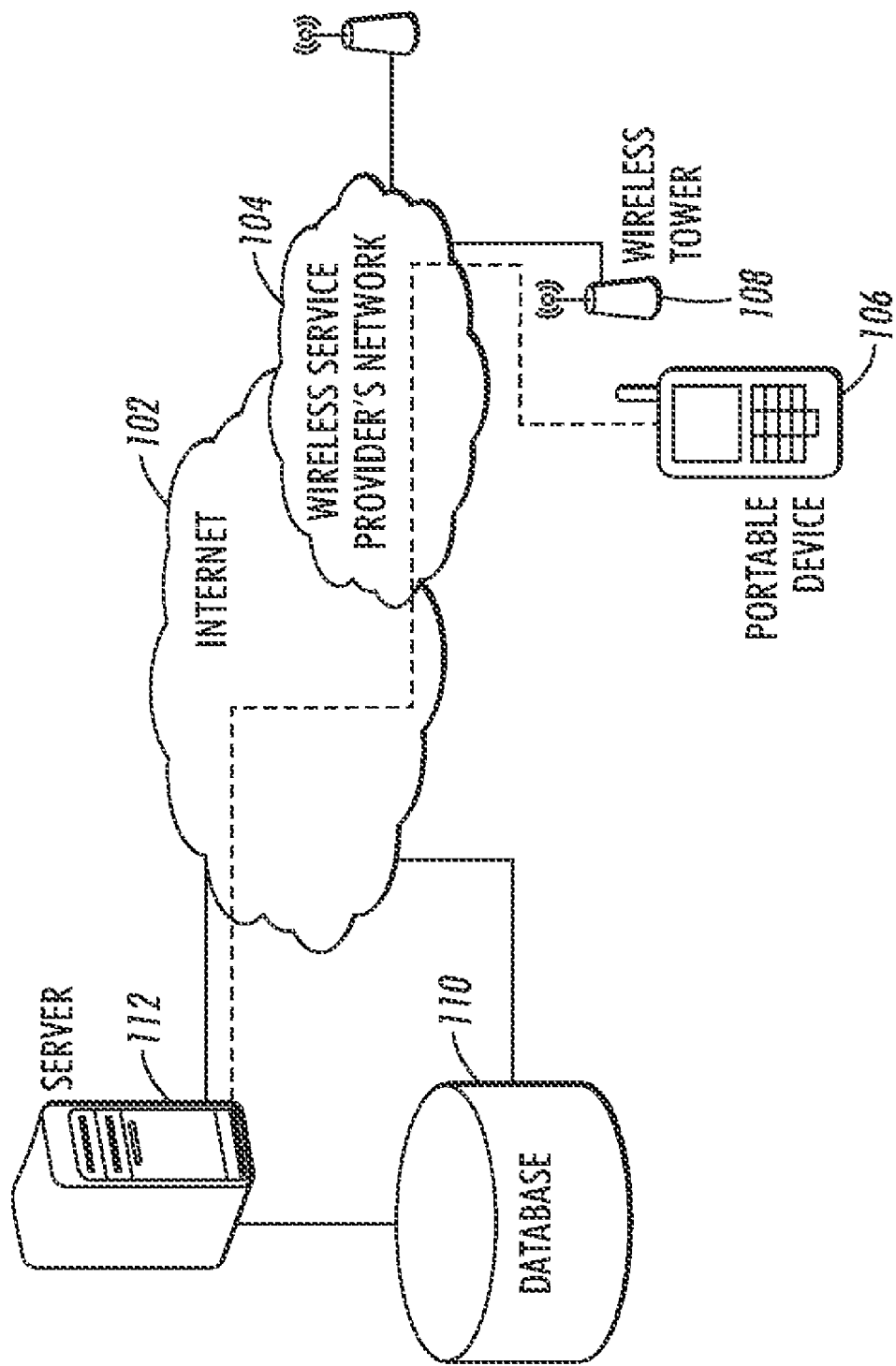
FIG. 1 presents an exemplary mode of operation of an activity recommender system in accordance with one embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), Application-Specific Integrated Circuits (ASICs), Field Programmable Gate Arrays (FPGAs), or other media capable of storing computer readable media now known or later developed.

Overview

In today's world, one faces many choices on a regular basis, even for small tasks such as where to go for lunch and where to shop. This is partly because there are now more choices available, and partly because information technologies, such as the Internet and wireless technologies, have made information much more accessible than before. Nevertheless, even in this age of information-overload, finding something to do with one's time in a city can still be difficult. There can be a great many choices, but city guides both online and on paper are difficult to search. Even location-based search services require the user to make some kind of choice (such as deciding what to search—shops, restaurants, museums, etc.) and to input information, which can be awkward and slow.

Embodiments of the present invention provide an activity recommendation system that can predict a user's activity preference or habits, and recommend future activities that are tailored to the user's personal behavior patterns without requiring the user to explicitly enter search criteria or provide personal data.

In the present disclosure the term "activity" refers to a set of physical or mental actions or a combination of the two performed over a period of time (typically over at least a few minutes) to accomplish a cognitive goal of which the user is consciously aware. For example, activities can include working, shopping, dining, playing games, playing sports, watching a movie, and watching a performance. Note that an activity should be distinguished from simple physical movements such as walking, pressing buttons, picking up objects, typing on a keyboard, moving a mouse, etc. For the purpose of this disclosure, these physical movements are not activities, although they may be considered as actions in the process of performing an activity.

The present inventive recommender system can detect and predict its user's activities by combining multiple sources of information, such as a person's location, their email content, calendar entries, current time, and records of previous user activities, etc. In particular, the present recommender system can predict a user's engagement in a future activity, recommend one or more future activities, and recommend content related to a predicted or recommended activity.

In some embodiments, the present recommender system employs a client-server architecture. FIG. 1 presents an exemplary mode of operation of an activity recommender system in accordance with one embodiment of the present invention. A user's portable device 106 runs the client-side software of the recommender system. Portable device 106 is in communication with a wireless tower 108, which is part of a wireless service provider's network 104. Wireless service provider's network 104 is also coupled to the Internet 102. During operation, portable device 106 submits queries to a server 112. Server 112 runs the server-side software of the recommender system. Server 112 is also in communication with a database 110, which stores the location data, venue/activity data, and optionally user-profile data for multiple users.

In one embodiment, portable device 106 includes sensing devices, such as a Global Positioning System (GPS), which observe the physical state associated with the user. Portable device 106 can send this state information to and query server 112. Server 112 computes an activity type distribution matching this state information, based on user-profile or general population data regarding activity types. The activity-type distribution is used to predict how likely it is that the user is going to or would like to engage in different types of activities. Server 112 then performs a search over database 110 to return venues affording activity types that match any activity types that have a non-zero probability and whose location are within a set distance from device 106's specified location. It then ranks venues according to a metric-weight distribution in terms of their match to user specified preferences and the user profile derived from past behavior such as accessed contents, past venue ratings, inferred venue visits, etc. Finally, server 112 compiles a list of venues affording activity types in a proportion matching the corresponding activity type probabilities and sends the list back to portable device 106 to display.

System Architecture and Operation

Figure 2:
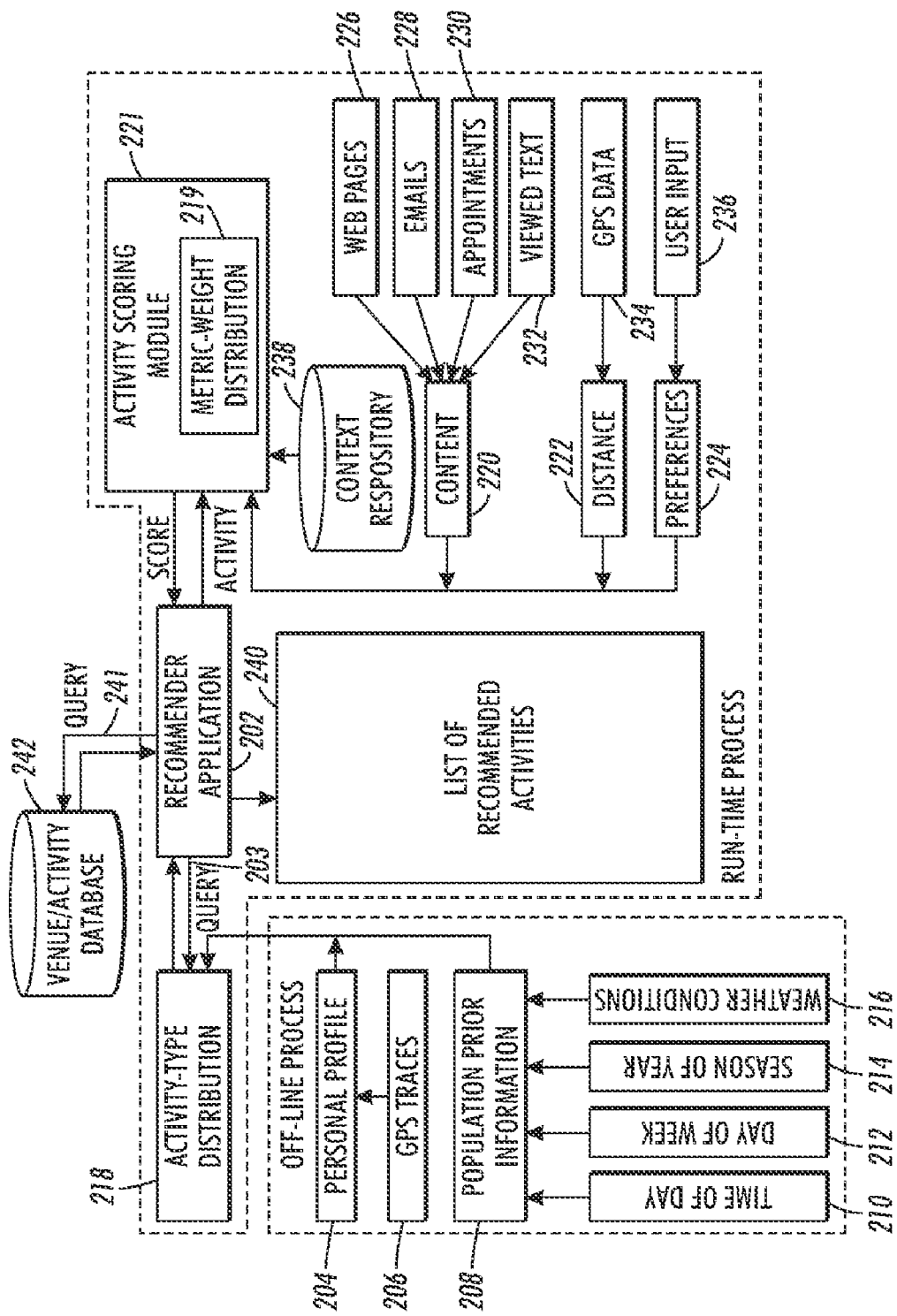
FIG. 2 presents a block diagram illustrating an exemplary architecture for an activity recommender system in accordance with one embodiment of the present invention.

FIG. 2 presents a block diagram illustrating an exemplary architecture for an activity recommender system in accordance with one embodiment of the present invention. In one embodiment, the operation of the present recommender system includes an off-line process and a run-time process. The off-line process derives a user-specific activity-type distribution which can be used to predict the type of future activities the user is likely to engage in. The run-time process generates a metric-weight distribution, ranks specific activities based on the metric-weight distribution, and produces a final list of the recommended activities.

Note that in one embodiment of the present invention, the activity types include "eat," "buy," "do," "see," and "read." Each activity type can include different specific activities. For example, "eat" can include eating lunch, drinking coffee, having a drink, eating dinner, etc. Furthermore, a specific activity can also have different contents. For example, "eating lunch" can be further specified as "eating Mexican food for lunch at restaurant ABC" or "ordering Chinese takeout at restaurant ABC." The present recommender system can perform prediction and/or recommendation on these three levels of abstraction.

Note that although the computation of activity-type distribution is designated as an off-line process, the system can also perform this computation in real-time, either at the server or the client. Similarly, the computation of metric-weight distribution can also be performed by the server or client. The example in FIG. 2 is only for illustration purposes. The actual implementation of this architecture may vary from one embodiment to another.

As is illustrated in FIG. 2, during operation, a recommender application 202 first sends a query 203 to the server to obtain an activity-type distribution 218 for the user. Query 203 may include a set of contextual information associated with the user, such as the user's identifier, a current time, day of week, week of year, user location, the user's location trace in the past hour, etc. Query 203 may also include contextual information, such as a different time or a different location, explicitly provided by the user. After receiving query 203, the server performs an analysis of the user's contextual information and a set of statistical information associated with the user or general public or a population matching the user in terms of certain criteria such as age, gender, or working hours.

In one embodiment, the system maintains a user profile 204 for one or more users. This user profile can be generated by a user's past activity or contextual data. In one embodiment, the system uses a user's previous GPS traces 206 to build a user profile. A GPS trace typically includes a serious of coordinates and the corresponding time stamps. The system can map a GPS trace to a venue map and identify correlations between how much time a user spends at one location and the venues in the vicinity of that location. These venues can often be associated with activity types. For example, a restaurant is associated with the "eating" type, and a shop is associated with the "buy" type. In this way, the system can build a user profile that indicates, based on historical data, what types of activities the user usually does at a particular time, around a particular location. The system can then use this user profile, in conjunction with the contextual information received with query 203, to derive the activity-type distribution 218.

For example, if a user's past GPS traces often indicate that he regularly spends one hour around noon in one of a number of restaurants, the system can build a profile for him indicating that he usually eats at noon. And, when query 203 indicates a time close to noon, the system would increase the probability of activity type "eating" when computing the activity-type distribution 218. Note that in one embodiment, the system can also demote an activity type based on the contextual information. In the above example, if the contextual information indicates that the user has spent the last hour in a restaurant, the system would infer that the user has already eaten, and therefore would decrease the probability of activity type "eating" in the activity-type distribution 218.

In some cases, a user's profile may not be available (e.g., when the user uses the recommendation system for the first time and the system has no prior data for this user). The system can then use a set of population prior information 208, which is a profile of the general population or a subset thereof, to predict activity-type distribution 218. Population prior information 208 can be conditioned upon various types of contextual information, such as time of day 210, day of week 212, season of year 214, and/or weather conditions 216. In one embodiment, the system can use publicly available information, such as data published by the census bureau, as population prior information 208.

After receiving the activity-type distribution 218, recommender application 202 makes a query 241 to the venue/activity database 242. Venue/activity database 242 stores information for a number of venues for various activities. Query 241 may specify the time and location, either sensed or provided by the user, and the activity types in accordance with activity-type distribution 218. For example, if activity-type distribution 218 returns a distribution of 60% "eating," 20% "buying," and 20% "doing," query 241 would specify "eating," "buying," and "doing" as activity types. In response, venue/activity database 242 would only return venues that have opening hours matching the time and affording these three types of activities in the vicinity of the specified location.

After receiving a number of activities (and venues) from venue/activity database 242, recommender application 202 then runs each activity by an activity scoring module 221, which in one embodiment assigns a normalized score to each activity based on a set of metrics and an activity metric-weight distribution 219. The activity is scored with different metrics, and the final score is weight-averaged based on the metric-weight distribution 219. The different score metrics can be based on various information, such as content 220 the user has previously accessed, the distance 222 between the activity's location and the user's current or provided location, and optionally a set of user preferences 224.

Specifically, content 220 can include web pages 226, emails 228, the user's appointments or calendar entries 230, or any type of previously viewed text 232. In one embodiment, the system can extract keywords from these contents (e.g., from the user's system cache or temporary Internet files), and compare the activity's description against these keywords. If there is a match, the activity would receive a boost in its score.

Distance metric 222 is computed based on the user's sensed or provided GPS data 234 and the activity's location. If the distance is large, the system can demote the activity by reducing its score with respect to the distance metric.

The system can also receive explicit user preferences 224 based on user input 236. If the activity matches user preference 224, the system can assign a high preference score to the activity. Otherwise, the activity would receive a low score.

Note that the scoring mechanism can be reconfigurable and specific to each metric. In addition, the system may add, remove, or modify the metrics. Furthermore, the system may additionally use a context metric based on the user context and a context repository 238 to generate a context-specific score. The context repository 238 may specify the scoring scheme for specific context-activity combinations. For example, certain restaurants might receive a high context-score if the activity is queried for during lunch time, or a special time of the year.

After receiving scores for each activity, recommender application 202 then ranks all the activities represented by venues under one type, and selects a number of top ranked activity-affording venues according to the activity-type distribution 218. For example, if activity-type distribution 218 specifies 60% "eating," 20% "buying," and 20% "doing," recommender application 202 can generate a list of venues as recommended activities 240 which includes 10 activities, 6 of which are related to "eating", 2 of which are related to "buying," and 2 of which are related to "doing."

In further embodiments, the system also detects whether the user is together with another user. For example, the system can detect whether the user is co-present with another user for the first time. If this is true, the system can combine both user's individual activity-type distributions to generate a joint activity-type distribution. The system can also combine both user's individual metric-weight distributions to generate a joint metric-weight distribution. In the case where two or more users have been co-present repeatedly in the past, the system can build a user profile for this group of users and also construct a single metric-weight distribution. In other words, the system can treat a group of users as a single user and apply the same activity prediction and recommendation process as described above.

In further embodiments, the system can be extended to recommend support activities to facilitate performance of a recommended activity. For example, if one of the recommended activities is "go to a concert," the system can recommend a place where the user can purchase the ticket for the concert.

Figure 3:
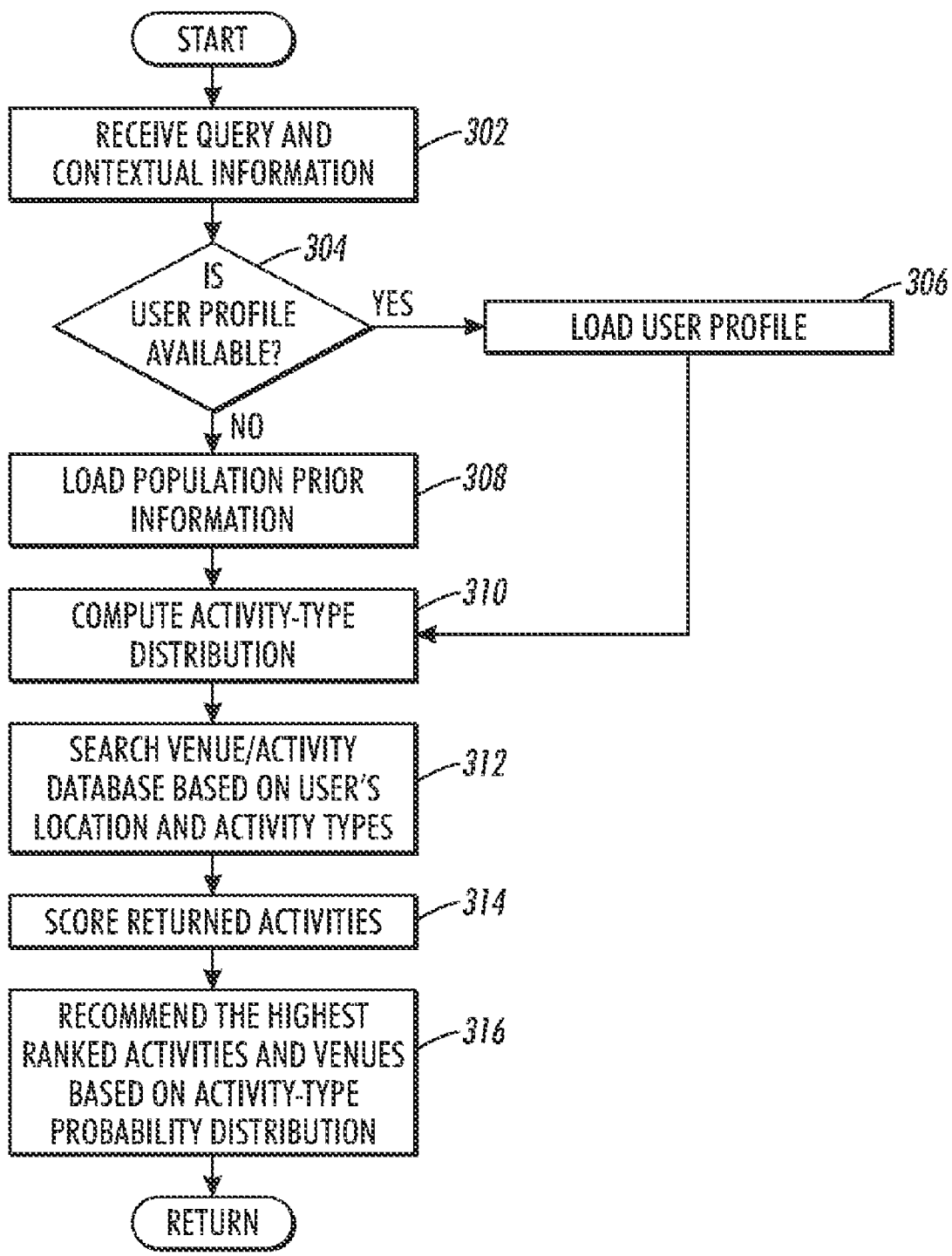
FIG. 3 presents a flow chart illustrating an exemplary process of predicting activity types and recommending future activities in accordance with one embodiment of the present invention.

FIG. 3 presents a flow chart illustrating an exemplary process of predicting activity types and recommending future activities afforded by various venues in accordance with one embodiment of the present invention. During operation, the system receives a query for activity types and the corresponding contextual information (operation 302). The system then determines whether a user profile is available (operation 304). If a user profile is available, the system loads the user profile (operation 306). Otherwise, the system loads a set of population prior information (operation 308). The system then computes the activity-type distribution based on the user profile or the population prior information, and the contextual information (operation 310).

Subsequently, the system searches a venue/activity database based on the user's location and the activity types specified in the activity-type distribution (operation 312). The system then scores the returned activities (operation 314). Next, the system recommends the highest ranked activities and the corresponding venues based on the activity-type distribution (operation 316).

Exemplary Population Prior Information

Figure 4:
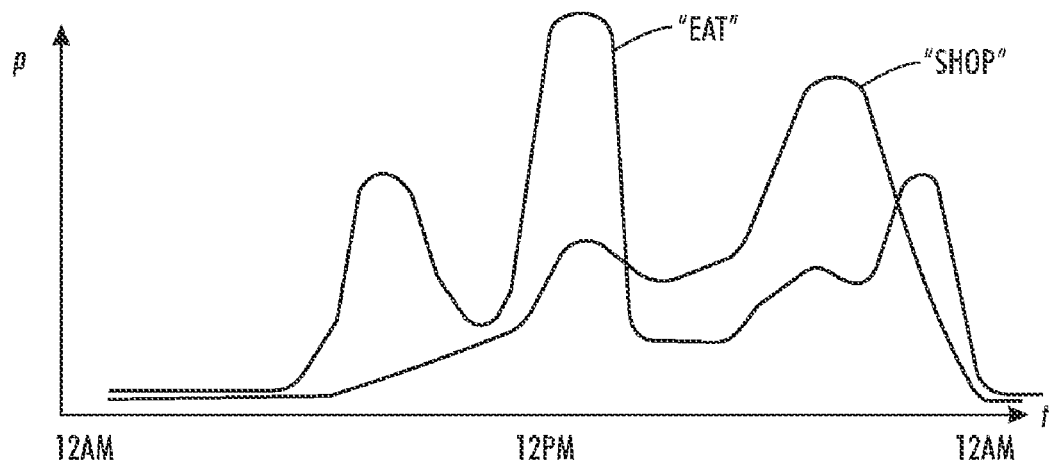
FIG. 4 illustrates a set of exemplary population prior information indicating general time preferences with respect to eating and shopping activities in accordance with one embodiment of the present invention.

FIG. 4 illustrates a set of exemplary population prior information indicating general time probabilities, p, with respect to eating and shopping activities in accordance with one embodiment of the present invention. As shown in FIG. 4, two curves indicate the probability that one is either eating or shopping during different times of a day. These curves are generated based on surveys of a large number of people. Generally, such data can be obtained from government agencies, such as the U.S. Census Bureau. In one embodiment, the recommender system can also build its own population prior data based on GPS traces collected over a large number of users and a long period of time.

Exemplary Computer and Communication System

Figure 5:
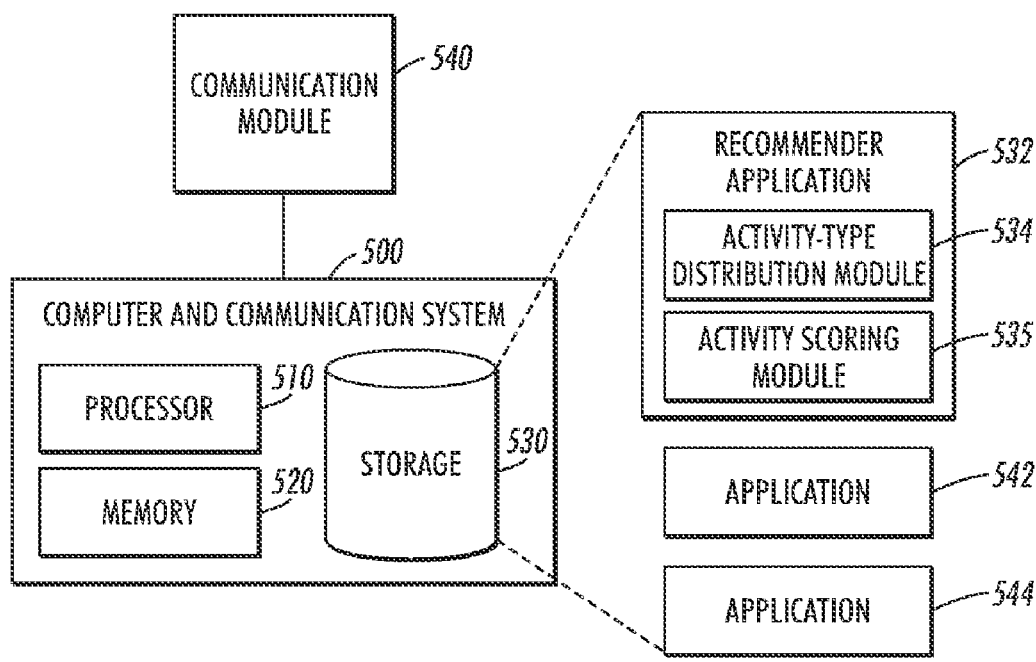
FIG. 5 illustrates an exemplary computer and communication system which facilitates a recommender system that predicts activity types and recommends future activities in accordance with the present invention.

FIG. 5 illustrates an exemplary computer and communication system which facilitates a recommender system that predicts activity types and recommends future activities in accordance with the present invention. Computer and communication system 500 is coupled to a communication module 540, and includes a processor 510, a memory 520, and a storage device 530. Storage device 530 stores a recommender application 532 as well as applications 542 and 544. Recommender application 532 includes an activity-type distribution module 534, and an activity scoring module 535. During operation, recommender application 532 is loaded from storage device 530 into memory 520 and executed by processor 510.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for recommending activities to a user, the method comprising:
   retrieving an activity-type distribution for a user based on the user's personal profile, wherein the activity-type distribution includes one or more activity types and a likelihood that the user engages in one or more activities associated with each activity type during a respective time period;
   responsive to no activity-type distribution being retrieved, determining the activity-type distribution for the user based on population prior information, which comprises a profile corresponding to a portion of general population;
   predicting a set of activities that the user will engage in at a future time based on the activity-type distribution;
   assigning a score to each predicted activity based on a set of metrics, wherein the score corresponds to a probability for the user engaging in the activity at the future time, and wherein the score is weight-averaged based on a metric-weight distribution; and
   recommending one or more of the predicted activities based on the score.

2. The method of claim 1, further comprising recommending a number of activities to be performed by the user in the future.

3. The method of claim 1, further comprising recommending a number of venues based on the activity-type distribution and the weight distribution.

4. The method of claim 1, wherein the activity-type distribution is further determined based on at least one of:
   a time of day;
   a day of week;
   a week of year;
   an indication of a holiday;
   an indication of a date of personal significance to the user;
   a weather condition; and
   a content previously accessed by the user.

5. The method of claim 4, wherein the content accessed by the user can include one or more of:
   an email;
   an instant message;
   a web page;
   an appointment;
   a calendar entry; and
   a phone call.

6. The method of claim 1, wherein the activity-type distribution is further determined based on:
   a location; and
   one or more activity types associated with the venues in the vicinity of the location.

7. The method of claim 1, further comprising constructing the user's personal profile based on information indicative of the user's past activities in specific contexts.

8. The method of claim 1, further comprising estimating a current or past activity type the user is or has engaged in; and
   wherein recommending the activities comprises filtering activities which are inconsistent with the estimated current or past activity.

9. The method of claim 1, further comprising recommending a support activity which facilitates the performance of a recommended activity.

10. The method of claim 1, further comprising:
    determining that the user is co-present with at least one other user for the first time;
    combining all the users' individual activity-type distributions to generate a joint activity-type distribution; and
    combining all the users' individual metric-weight distributions to generate joint metric-weight distributions; and
    wherein the recommendation of the activities is based on the joint activity-type distribution and joint metric-weight distribution.

11. The method of claim 1, further comprising:
    determining that the user has been repeatedly co-present with at least one other user; and
    constructing the personal profile for all the users who have been co-present.

12. The method of claim 1, further comprising collecting data about the user's preferences about activities or activity types when the user interacts with a device that presents the recommended activities.

13. A computer system for recommending activities to a user, the computer system comprising:
    a processor;
    a memory;
    an activity-type distribution module configured to retrieve an activity-type distribution for a user based on the user's personal profile,
    wherein the activity-type distribution includes one or more activity types and a likelihood that the user engages in one or more activities associated with each activity type during a respective time period,
        wherein the activity-type distribution module is further configured to determine the activity-type distribution for the user based on population prior information, which comprises a profile corresponding to a portion of general population in response to no activity-type distribution being retrieved;
    prediction mechanism configured to predict a set of activities that the user will engage in at a future time based on the activity-type distribution;

a scoring mechanism configured to assign a score to each predicted activity based on a set of metrics, wherein the score corresponds to a probability for the user engaging in the activity at the future time, and wherein the score is weight-averaged based on a metric-weight distribution; and a recommendation mechanism configured to recommend one or more of predicted activities based on the score.

14. The computer system of claim 13, further comprising a recommendation mechanism configured to recommend a number of activities to be performed by the user in the future.

15. The computer system of claim 13, further comprising a number of venues based on the activity-type distribution and the weight distribution.

16. The computer system of claim 13, wherein the activity-type distribution is further determined based on at least one of:
- a time of day;
- a day of week;
- a week of year;
- an indication of a holiday;
- an indication of a date of personal significance to the user;
- a weather condition; and
- a content previously accessed by the user.

17. The computer system of claim 16, wherein the content accessed by the user can include one or more of:
- an email;
- an instant message;
- a web page;
- an appointment;
- a calendar entry; and
- a phone call.

18. The computer system of claim 17, wherein the activity-type distribution is further determined based on:
- a location;
- one or more activity types associated with the venues in the vicinity of the location.

19. The computer system of claim 13, further comprising a user profile construction mechanism configured to construct the user's personal profile based on information indicative of the user's past activities in specific contexts.

20. The computer system of claim 13, further comprising an estimation mechanism configured to estimate a current or past activity type the user is or has engaged in; and
wherein while recommending the activities the recommendation mechanism is configured to filter activities which are inconsistent with the estimated current or past activity.

21. The computer system of claim 13, wherein the recommendation mechanism is further configured to recommend a support activity which facilitates the performance of a recommended activity.

22. The computer system of claim 13, further comprising a multi-user monitoring mechanism configured to:
determine that the user is co-present with at least one other user for the first time;
combine all the users' individual activity-type distributions to generate a joint activity-type distribution; and
combine all the users' individual metric-weight distributions to generate joint metric-weight distributions; and
wherein the recommendation of the activities is based on the joint activity-type distribution and joint metric-weight distribution.

23. The computer system of claim 13, further comprising a multi-user monitoring mechanism configured to:
determine that the user has been repeatedly co-present with at least one other user; and
construct the personal profile for all the users who have been co-present.

24. The computer system of claim 13, further comprising a data collection mechanism configured to collect data about the user's preferences about activities or activity types preferences when the user interacts with a device that presents the recommended activities.

25. A non-transitory computer readable storage medium storing instructions which when executed by a computer cause the computer to perform a method for recommending activities to a user, the method comprising:
retrieving an activity-type distribution for a user based on the user's personal profile, wherein the activity-type distribution includes one or more activity types and a likelihood that the user engages in one or more activities associated with each activity type during a respective time period;
responsive to no activity-type distribution being retrieved, determining the activity-type distribution for the user based on population prior information, which comprises a profile corresponding to a portion of general population;
predicting a set of activities that the user will engage in at a future time based on the activity-type distribution;
assigning a score to each predicted activity based on a set of metrics, wherein the score corresponds to a probability for the user engaging in the activity at the future time, and wherein the score is weight-averaged based on a metric-weight distribution; and
recommending one or more of the predicted activities based on the score.

* * * * *